United States Patent Office 3,480,333
Patented Nov. 25, 1969

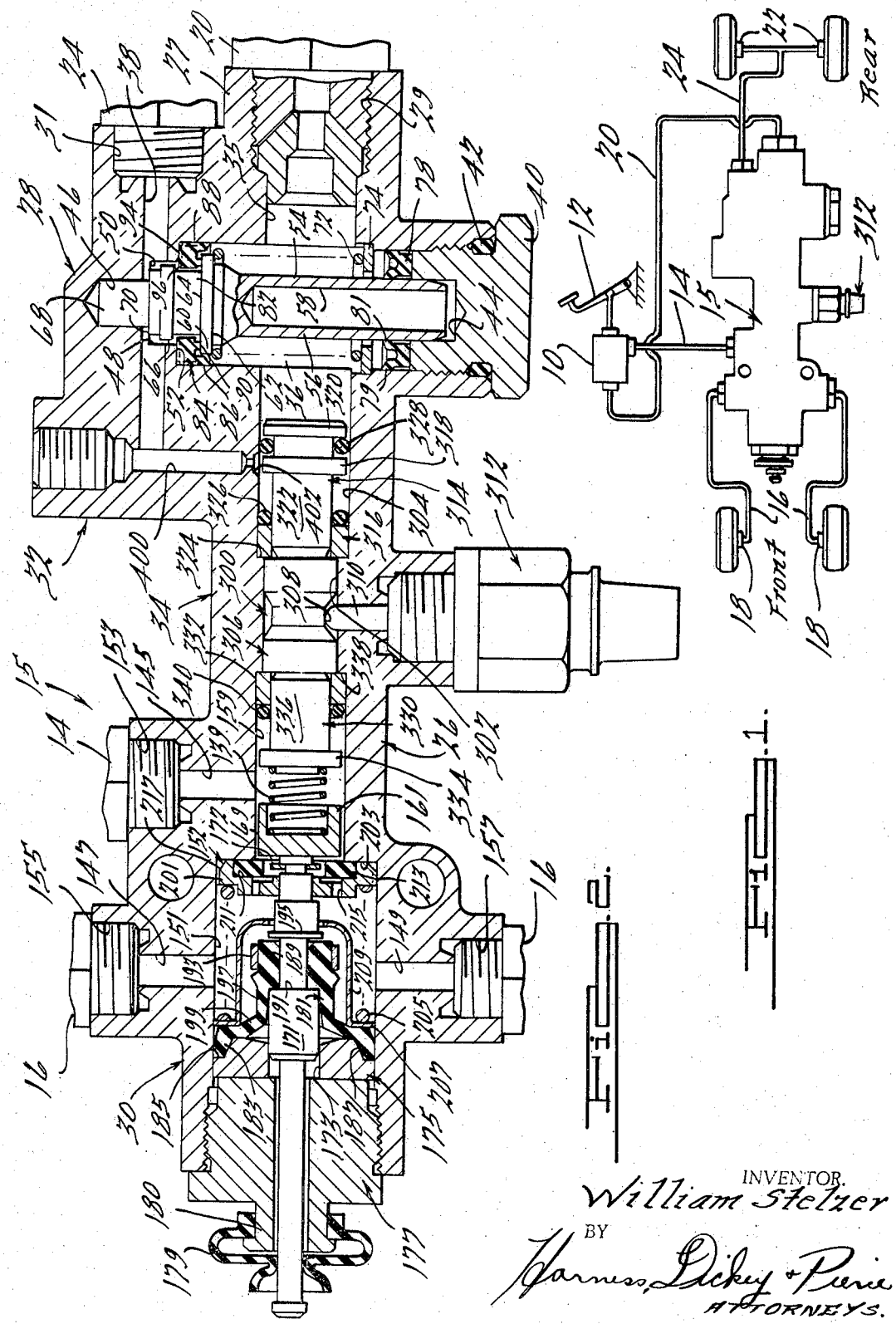

3,480,333
BRAKE FAILURE INDICATOR
William Stelzer, Bloomfield Hills, Mich., assignor to Kelsey-Hayes Company, Romulus, Mich., a corporation of Delaware
Filed Mar. 4, 1968, Ser. No. 710,200
Int. Cl. B60t 17/22
U.S. Cl. 303—6
18 Claims

ABSTRACT OF THE DISCLOSURE

Apparatus for providing an indication to a vehicle operator of failure of either the front or rear brakes, which apparatus will automatically reset itself upon correction of the failure.

---

The present invention relates to apparatus for providing an indication to a vehicle operator of failure of one of two sets of brakes.

In automotive vehicles having dual master cylinders for separate hydraulic circuits to front and rear brakes, it is desirable to provide an indication to the vehicle operator of the occurrence of a faiulre (loss of fluid pressure) of either the front or rear brakes. With past indicating apparatus, while an indication of failure was provided the apparatus required manual resetting to remove the indication after correction of the failure. In some instances a sudden, rapid application of the brakes could result in an erroneous actuation of the apparatus. With the prior apparatus the erroneous actuation could result in the retention of a false failure indication. In the apparatus of the present invention the failure signal is automatically removed upon correction of the failure or, in the event of erroneous actuation as noted above, at the termination of the transient condition causing the erroneous signal.

Therefore it is an object of the present invention to provide new and improved apparatus for providing an indication of failure of one system of a dual brake system.

It is another object to provide new and improved apparatus of the above noted type and which will automatically reset upon removal of the condition causing its actuation.

In the present invention the failure indicating apparatus is combined with a proportioning valve to provide a novel combination. Therefore it is another object to provide a novel combination of the above noted apparatus and proportioning valve.

In the present invention the failure indicating apparatus is combined with a metering valve to provide a novel combination. Therefore it is another object of the present invention to provide a novel combination of the above noted apparatus and metering valve.

In the present invention the failure indicating apparatus is combined with a bypass valve to provide a novel combination. Therefore it is still another object of the present invention to provide a novel combination of the above noted apparatus and bypass valve.

It is another object to provide a novel combination including the above noted apparatus and a proportioning valve, metering valve, and bypass valve.

Other objects, features and advantages of the present invention will become apparent from the subsequent description and the appended claims taken in conjunction with the accompanying drawings, in which:

FIGURE 1 is a generally schematic diagram depicting the apparatus of the present invention in a hydraulic circuit for an automotive vehicle; and FIGURE 2 is a longitudinal sectional view of the apparatus of the present invention.

The proportioning valve assembly 28 is adapted to reduce the relative pressurization of the rear brakes of a motor vehicle with respect to the pressurization of the front brakes in the higher ranges of applied brake pressure. This is desirable in view of the fact that a portion of the weight borne by the rear wheels of the vehicle is transferred to the front wheels of the vehicle during rapid deceleration.

The indicating apparatus of the present invention is adapted for interposition in a standard vehicle braking system as diagrammatically illustrated in FIGURE 1. The apparatus of the present invention is utilized with a braking system which includes a dual master cylinder 10 which is operated by a brake pedal 12 to deliver brake fluid under pressure through a conduit 14 to the apparatus 15 and then to a pair of front brake cylinders 18 via conduits 16; fluid under pressure from master cylinder 10 is also transmitted through a conduit 20 to the apparatus 15 and then to a pair of rear brake cylinders 22 via conduit 24. The device 15 includes a housing 26 which houses a proportioning valve assembly 28, a metering valve assembly 30, a bypass valve 33 and a failure indicator assembly 34. Thus fluid under pressure is normally transmitted from master cylinder 10 through the proportioning valve assembly 28 in housing 26 to the rear brake cylinders 22, while fluid pressure to the front brake cylinders 18 is transmitted from the master cylinder 10 through the metering valve assembly 30 in housing 26.

The proportioning valve 28 can be of the type shown and described in the co-pending patent application of William Stelzer, Ser. No. 532,471, filed Mar. 7, 1966 for Pressure Proportioning Valve and that disclosure is incorporated herein by reference.

The housing 26 has an inlet boss 27 provided with a threaded inlet opening 29 arranged to receive brake fluid from the conduit 20, and a threaded outlet opening 31 adapted to communicate brake fluid to the conduit 24. A passage 35 is formed in the housing leading from the inlet opening 29 to a central bore shaped chamber 36. The passage 35 communicates with the chamber 36 generally at its midlength, while a passage 38 will be seen to extend from the upper end of the chamber 36 to the outlet opening 31. The chamber 36 is conveniently formed by drilling and/or boring from one end which is closed by a cap 40 and an O-ring seal 42 is fitted between the cap 40 and the housing 20 to prevent leakage therebetween. It will be seen that the cap 40 has a central blind bore 44 at its end facing into the chamber 36. The housing 26 also has a blind bore 46 at an opposite end disposed in axial alignment with the bore 44. Both of the bores 44 and 46 are of a lesser diameter than the chamber 36 and face into the chamber 36 from opposite ends. The chamber 36 has a reduced diameter portion 48 at its upper end adjacent the bore 46. An annular shoulder 50 is formed between the bore portion 48 and the bore 46 and an annular shoulder 52 is formed between the main portion of the chamber 36 and the reduced diameter portion 48.

The bores 44 and 46 serve to slidably support and guide a pressure responsive valve element or piston 54 which has an elongated hollow cylindrical portion 56 piloted in the bore 44. The cylindrical portion 56 is provided with an elongated central blind opening or cavity 58 which is open at its lower end to the bore 44. The valve element 54 has a radially extending annular flange 60 provided with a radially extending annular shoulder 62 on one side thereof and a radially extending annular shoulder 64 on its other side. Disposed above the flange 60 on the valve element 54 is a valve head or shoulder 66 which is of a generally annular configuration. At the uppermost end of the element 54 is a projection 68 which is slidably fitted in the blind bore 46.

The pressure responsive valve element 54 is biased upwardly so that a shoulder 70, disposed adjacent the upper end thereof just below the projection 68, abuts the shoulder 50. This is accomplished by a spring 72 which engages the shoulder 62 at its upper end and is seated against a snap ring 74 at its lower end. Disposed beneath the ring 74 and immediately above the cap 40 is a cup-type seal 78. The seal 78 is arranged so that a flange 79 thereof engages the wall of the chamber 36 and another flange 81 engages the outer periphery of the tubular portion 56 of the pressure responsive element 54. When subjected to a high pressure from within the chamber 36, the seal member 78 functions to prevent the downward movement of fluid therepast. However, should brake fluid leak past the seal 78, to the bore 44 or cavity 58, it will be able to flow back past the seal 78 to the chamber 36 in a manner to be explained.

The pressure responsive element 54 has a reduced diameter cylindrical portion 82 interposed between the shoulder 64 and the valve head 66 thereof. Spacedly surrounding the portion 82 is an elastomeric annular valve member 84. The valve member 84 is engageable with the shoulder 52, the wall of the chamber 36, and the annular shoulder 64. The valve head 66 functions either to permit the transmission of fluid pressure from the chamber 36 to the outlet opening 31, or to close this fluid path and modulate the pressure at the outlet opening 31 with respect to the pressure at the inlet opening 29. This is accomplished by the vertical movement of the pressure responsive element 54 in response to the various fluid pressures acting on it.

The valve member 84 has a depending lip 86 which, in the free state of the valve member 84, is inclined angularly downwardly and radially outwardly. When the valve member 84 is fitted in the chamber 36, its lip 86 is deflected radially inwardly slightly by the engagement of its outer periphery with the wall of the chamber 36. This prevents the upward flow of fluid from the chamber 36 around the lip 86. The outer periphery of the valve member 84, above the lip 86, is provided with a plurality of circumferentially spaced axially extending ribs 88 of generally semicylindrical shape. The ribs 88 contact the wall of the chamber 36 above the lip 86. The flange 60 of the valve element 54 lies partly within the lip 86, and its shoulder 64 engages a plurality of spaced hemispherical bosses 90 projecting downwardly from the lower side of the valve member 84. The outer diameter of the flange 60 is less than the inner diameter of the lip 86, thus permitting fluid to flow from the chamber 36 through the spaces between the bosses 90. Also, the diameter of the cylindrical portion 82 of the valve element 54 is less than the diameter of an inner peripheral surface 92 of the valve member 84 adjacent thereto so that an open fluid path from the space between the bosses 90 to the passage 38 with the element 54 disposed in the position illustrated in the drawing.

The upper end of the valve member 84 is provided with a plurality of angularly spaced ribs 94 engageable with the shoulder 52 and angularly aligned with the ribs 88 to provide spaces therebetween for the flow of fluid from the passage 38 out between the shoulder 52 and the valve member 84, to the spaces between the ribs 88 formed on the outer periphery of the valve member 84. By this means, fluid pressure at the outlet opening 31 can gain access to the outer periphery of the lip 86 so that if fluid pressure at the outlet opening 32 is higher than fluid pressure at the inlet opening 29 after valve closure, the outlet pressure can force the lip 86 radially inwardly for the reverse flow of fluid from the outlet opening 31 to the chamber 36 around the valve member 84. It will be seen that the valve member 84 has a rounded valve seat 96 disposed at the upper end of its inner peripheral surface 92. The seat 96 is engageable with the valve head or shoulder 66 of the pressure responsive valve element 54 upon downward movement of the element 54 against the spring 72.

The operation of the valve in providing a path for the direct transmission of pressure from the inlet opening 29 to the outlet opening 31 has already been described. This path remains open until the fluid pressure delivered by the master cylinder 10 attains a predetermined level. At this time the valve head 66 will close against the valve member seat 96. The level of pressure at which this occurs is dependent upon the force of the spring 72 compared to the effective area of the valve element 54, acted upon by inlet fluid pressure in a direction opposing the force of the spring 72. This effective area is equal to the diameter of the cylindrical portion 56 of the valve element 54, inasmuch as the lower end of the cylindrical portion 56 is sealed off from the inlet fluid pressure by the seal 78 while fluid pressure acts against all of the remaining portions of the valve element 54, including the projection 68. During the lower ranges of applied brake effort the pressure acting on this effective area produces a downward force which is insufficient to overcome the force of the spring 72.

After the valve head 66 closes against the valve member 84 and the fluid pressure at the inlet opening 28 is further increased by the master cylinder 10, the increased level of fluid pressure will act against the valve element 54 over an effective circular area having a diameter equal to the mean sealing diameter of the valve head 66. This produces an upward force on the valve element 54 assisting the spring 72 and tending to reopen the valve element 54 to deliver at least a portion of this increased fluid pressure to the outlet. Any of this increased fluid pressure delivered to the outlet 31 creates an opposing downward force on the valve element 54 acting downwardly on the valve element 54. This, of course, tends to reclose the valve element 54 against the valve member 84. These opposing forces tend to keep the valve head 66 closely adjacent to the valve member seat 96 for the restricted flow of fluid from the inlet opening 29 to the outlet opening 31 to create a pressure at the outlet opening 31 which increases at a lower rate than the pressure at the inlet opening 29. The ratio of the pressures is determined by the relationship of the effective areas previously referred to and hence the fluid pressure existing in the front brake cylinders 18 will be greater than the fluid pressure in the rear brake cylinders 22 when the brakes are applied with a force greater than necessary to move the valve element 54 against the spring 72.

During that portion of a brake application in which the applied pedal effort is reduced subsequent to a brake application of sufficient intensity to have moved the valve element 54 to the restricted flow position the forces tending to move the valve element 54 upwardly are reduced and the valve element 54 moves downwardly under the influence of the pressure at the outlet opening. As the valve element 54 moves downwardly, its head 66 slides within the inner peripheral surface 92 of the valve member 84, thereby increasing the available volume for the fluid at the rear brake cylinders 22 and thereby accomplishing a reduction in pressure. The valve element will continue its downward movement in an effort to reduce the pressure. The valve element 54 may not completely achieve this result because of the limited possible downward travel thereof. During the decrease in brake pressure, the pressure at the outlet opening 31 can never be greater than the pressure at the inlet opening 29. This is because the fluid at the outlet opening 31 is able to flow downwardly around the valve member 84 between the lip 86 and the wall of the chamber 36 if the fluid pressure in the chamber 36 is at a lower lever. The valve member 84 accordingly functions as a check valve to prevent rear brake pressure from ever being greater than front or master cylinder pressue. If the fluid leaks downwardly past seal 78 during a brake application, this fluid will accumulate at the bottom of the bore 44 and, in so doing, it will compress the air which normally occupies the cavity 58 and the bore 44. When the pressure from the master cylinder is released, the air which was compressed by the leaking brake fluid will attempt to expand and force the leaked brake fluid upwardly back into the chamber 36. Such a flow of fluid occurs since the seal 78 permits fluid to flow upwardly between the flange 81 and the outer periphery of the tubular portion 56 by the radially outward deflection of the flange 81.

While the proportioning valve assembly 28 acts on the rear brakes the metering valve assembly 30 operates on the front brakes.

The metering valve assembly 30 can be of the type shown and described in U.S. Patent No. 3,278,241 to W. Stelzer issued Oct. 11, 1966, and that disclosure is incorporated herein by reference. As noted in the subject patent, the metering valve assembly 30 is used when the front brakes are disc brakes and the rears are drum brakes.

When disc brakes are applied, they produce a brake torque almost as soon as hydraulic pressure is developed in the system whereas drum brakes require a substantial hydraulic pressure in the system before they produce a brake torque. Drum brakes utilize relatively heavy return springs, the force of which must be overcome before the shoes contact the drum while disc brakes use either no return springs or very light return springs. In either case, the disc brakes require only a relatively small pressure at their brake cylinders to cause actuation thereof.

If a vehicle is provided with drum brakes on its rear wheels and disc brakes on its front wheels and no metering valve for the disc brakes is employed, the disc brakes will develop high braking torque during a light brake application. As a result the linings of the disc brake shoes will tend to wear out prematurely.

The valve assembly 30 is interposed between the master cylinder and the disc brake cylinders 18 and will retard the delivery of fluid pressure to the disc brake cylinders during pedal application until master cylinder pressure reaches a predetermined level. Preferably, this level is equal to or greater than the pressure at which the force of the drum brake return springs will be overcome, thereby causing the disc brakes to produce a braking torque at the same time or after the drum brakes and preventing inadvertent application of the disc brakes.

The metering valve 30 has an inlet opening 145 and a pair of outlet openings 147, 149 communicated by a generally cylindrical bore 151. A pressure responsive valve assembly, indicated generally at 152, is adapted to control communication between the inlet 145 and the outlets 147, 149. The inlet opening 145 has an enlarged threaded outer end 153 receiving the end of the conduit 14 and the outlet openings 147, 149 have enlarged threaded outer ends 155 and 157 receiving the ends of the conduits 16.

The bore 151 has a reduced diameter inner end 159 adjacent the inlet opening 145 and in which a valve cup 161 forming a part of the valve assembly 152 is movably disposed. The cup 161 is generally cylindrical in cross-section and is in close clearance with the reduced bore 159 to define a passage 169 through which hydraulic fluid can pass to the inlet opening 145.

A spring 139 engages the valve disc 161 under light spring pressure so that the valve cup 161 moves away from the reduced bore end wall or shoulder 203. However, a push rod 171 extends slidably through a valve plate 201 and normally engages the end of the valve cup 161 and holds it in place. A snap ring 172 on the push rod 171 holds the push rod and valve plate 201 together during assembly. As shown, the push rod 171 is slidably received in an opening 173 formed in a washer or plug 175 positioned in the bore 151. A cap 177 removably retains the plug 175 within the bore 151 and a flexible boot 179 surrounds a reduced end 180 of the cap 177 and the outer end of the push rod to keep dirt, grease or other foreign matter from gaining access to the opening 173. A diaphragm 181, formed of molded flexible rubber or other suitable material has an outer flanged end 183 snugly received in an annular groove 185 formed between the wall of the bore 151 and a reduced inner end portion 187 of the plug 175. This flanged end 183 forms a seal preventing the flow of fluid past the outer periphery of the plug 175 and positions the diaphragm 181 within the bore 151. The inner end of the diaphragm 181 has a radially inwardly extending flange 189 snugly fitted over and gripping the push rod 171. The flange 189 is held on the push rod 171 adjacent a radial shoulder 191 by a split clamp 193 and by a retaining ring 195.

The diaphragm flanges 183, 189 are interconnected by intervening somewhat thinner and more flexible axial and radial sections 197, 199, respectively. The diaphragm 181 is molded or otherwise suitably formed to the configuration illustrated and normally holds the push rod 171 in the position illustrated in FIGURE 2 where it holds the valve cup 161 in clearance relation to keep passage 169 opened. However, when a fluid force within the bore 151 acts against the diaphragm 181, the radial section 199 can move against the plug 175 and the push rod 171 within the bore 151 whereupon the cup 161 moves inwardly by action of spring 139. When the external force is removed, the resilient diaphragm 181 returns to its natural configuration and the parts assume the positions shown in FIGURE 2.

The valve plate 201 is positioned within the bore 151 and is held against the radial shoulder 203 by one end of a compression spring 205. The other end of the compression spring 205 engages a flange 207 formed on a metal retainer 209 and engaging the diaphragm outer flange 183. This retainer engages the diaphragm flange 189 during assembly of the parts and holds the spring 205 against the valve plate 201. The valve plate 201 has a recess 211 formed in its inner or upper end and adapted to receive an annular seal 213. With the parts in their positions illustrated in FIGURE 2, the seal 213 engages the shoulder 203 and prevents the flow of fluid therepast. However, the valve plate 201 has a plurality of axial openings 215 therethrough so that fluid entering the housing inlet 145 from the master cylinder 10 and flowing through the passageway 169 around the valve cup 161 passes through the openings 215 in the valve plate 201 and enters the bore 151.

Before actuation of the brake pedal 12 the parts are in the positions illustrated in FIGURE 2, the diaphragm 181 holding the push rod 171 against the valve cup 161 so that passage 169 is opened. When the brake pedal 12 is initially actuated, fluid is delivered from the master cylinder 10 through the conduit 14 to the metering valve inlet opening 145. From there, fluid flows through the passageway 169 and the openings 215 in the valve plate 201 and into the bore 151 where it acts upon the diaphragm 181 biasing the flange 189 downwardly and the radial section 199 against the plug 175. This moves the push rod 171 at some master cylinder pressure level away from the valve cup 161 whereupon the spring 139 moves it against the seal 213. Manifestly, this first level of master cylinder pressure which causes the push rod 171 to move is insufficient to actuate the brake cylinders 18. With the parts in this position, the valve 152 is closed and further fluid communication between the inlet 145 and the outlets 147, 149 and therefore the mast cylinder 10 and the front wheel brake cylinders 18 is blocked.

As master cylinder pressure increases with further pedal pressure, it acts against the valve cup 161 and the valve plate 201, tending to move them. This force is opposed by the spring 205 and by the force exerted on the plate 201 by the small amount of fluid trapped within the bore 151 when the valve cup 161 seats against the seal 213. The force imposed by the fluid trapped in the bore 151 at this point is comparatively small when compared with the force of the spring 205 and may be neglected here. Thus, the force of the spring 205, being substantially a constant, is overcome at a second predetermined level of master cylinder pressure to move both the valve plate 201 and the valve cup 161 and the seal 213 away from the shoulder 203 thereby opening the valve 152. The valve plate 201, is grooved at its outer periphery forming a plurality of angularly spaced passageways 217 so that when the valve 152 is opened in this manner, pressure fluid can pass from the inlet 145, between the cup 161 and end wall 167, along the passageway 169, through the passageways 217 and into the bore 151. The outlets 147, 149 are open to the bore 151 so that when the valve 152 opens as described, fluid flows through the conduits 16 and pressurizes the front wheel brake cylinders 18. This is the point of initial actuation of the front wheel brake cylinders and is determined by the master cylinder or pressure at the inlet 145 required to overcome the force of the spring 205. This second master cylinder pressure level is at least equal to or greater than that required to overcome the force of the heavy return springs utilized in the rear wheel drum brakes. Thus, premature energization of the front disc brakes is prevented and a braking torque is not developed at the disc brakes at least until one is developed at the rear drum brakes.

When the valve 152 opens as described, the master cylinder pressure or pressure at the inlet 145 develops a force on the valve cup 161 and valve plate 201 just sufficient to overcome the force of the spring 205. When the valve 152 opens, fluid enters the bore 151 from the master cylinder 10 and increases the pressure therein. This pressure acts on the valve plate 201 in a direction assisting the spring 205 and moves the plate back toward the shoulder 203 seating the seal 213 and closing the valve 152. The valve cup 161 and plate 201 remain in this position and valve 152 is closed until a further increase in master cylinder pressure acting on cup 161 and plate 201 is sufficient to overcome the opposing forces and reopen the valve 152. This alternate opening and closing of the valve 152 continues until the master cylinder pressure reaches a level where it completely overcomes the force of the spring 205 and the pressure of the fluid in the bore 151. At this point, the valve 152 remains open.

When the brake pedal 12 is released, master cylinder pressure drops whereupon the forces on the valve plate 201 and the spring 205 move the plate in the bore 151 and cause the seal 213 to seat against the shoulder 203. However, fluid pressure within the bore 151 is exerted upon the lower end of the valve cup 161 through the openings 215 in the valve plate 201 and causes the cup 161 to move and become unseated from the seal 213. Therefore, fluid pressure within the bore 151 is relieved through the opening 215, the passageway 169 around the valve cup 161, the inlet 145 and back to the master cylinder 10. Thus, when the brake pedal 12 is released, even though the push rod 171 remains in an actuated position as a result of the fluid pressure in the bore 151 which acts on the diaphragm 181 and holds the diaphragm wall 199 against the plug 175, the valve cup 161 can move to open the valve 152 and relieve pressure within the bore 151 and at the front wheel brake cylinders 18. When this pressure is relieved, the diaphragm 181 resumes its normal molded shape and the push rod 171 moves upwardly to hold the cup 161 in an open position.

In the event of failure in either the system to the front or rear brakes it is desired to provide a warning signal to the vehicle operator; this is done by the failure indicating assembly 34.

The housing 26 has a generally central longitudinally extending bore 300 which includes a central reduced diameter bore portion 302 and oppositely located increased diameter bore portions 159 and 304. The bore portion 159 functions with the metering valve assembly 30 as previously described and hence provides an indication of master cylinder input pressure to assembly 30. The bore portion 304 communicates with bore 36 of proportioning valve assembly 28 and hence provides an indication of master cylinder input pressure to assembly 28. A detent member 306 is slidably located in bore portion 302 and has an annular groove 308 which normally receives a plunger 310 of an electrical switch 312. The switch 312 with plunger 310 in groove 308 is deactuated and hence no signal will be provided to the vehicle operator. Upon movement of member 306 either to the right or left, in response to failure of either the front or rear brake system, the plunger 310 will be moved out of groove 308 and actuate switch 312 whereby an indication, i.e. visual, audio, etc., can be provided to the vehicle operator.

A piston 314 is located in bore portion 304 and is slidably supported by an annular bushing 316 which in turn is slidably located in bore portion 304. The piston 314 has a pair of enlarged flanges 318, 320 in clearance relation with bore portion 304 and has a reduced diameter portion 322 which is slidably supported by bushing 316. The pressure in bore portion 304 will normally maintain piston portion 322 in engagement with detent member 306 and bushing 316 in engagement with a shoulder 324 defined by the juncture of bore portions 302 and 304. An O-ring 326 on piston portion 322 provides a seal between bore portions 302 and 304. An O-ring 328 is located in a groove between flanges 318 and 320 and provides a seal for the by-pass valve 32 in a manner to be described.

The force applied on detent member 306 by piston 314 is normally opposed by a piston 330 located in bore portion 159. The piston 330 is slidably supported in an annular bushing 332 which is slidably located in bore portion 159. The piston 330 has an enlarged flange 334 in clearance relation with bore portion 159 and has a reduced diameter portion 336 slidably supported by bushing 332. The pressure in bore portion 159 will normally maintain piston 330 in engagement with detent member 306 and bushing 332 in engagement with a shoulder 338 defined by the juncture of bore portions 302 and 159. An O-ring 340 is located on piston portion 336 and provides a seal between bore portions 302 and 159. Note that spring 139 reacts against flange 334; however, the spring pressure is light and does not affect operation of piston 330. Thus normally the pressures in bore portions 304 and 159 will be substantially equal and hence the forces on opposite sides of detent member 306 will be equal and detent member 306 will not move. In the event of failure of the rear brake system (loss of pressure at line 20) the pressure in bore portion 159 will exceed that in bore portion 304 whereby piston 330, and hence detent member 306, will move to the right actuating the switch 312 to provide an indication to the vehicle operator. In the event of failure of the front brake system (loss of pressure) the detent member 306 will be moved to the left by piston 314 to provide an indication to the vehicle operator. Note that bushings 316 and 332 both extend radially inwardly to partially overlap bore portion 302 and are engageable with detent member 330 for a purpose to be described.

As previously noted the failure indicating apparatus will automatically reset upon correction of the failure condition (or termination of a transient causing unwanted actuation). In the event of failure of the rear brake system as the detent 306 is moved to the right it will move piston 314 and bushing 316 to the right. Upon correction of the failure condition and upon the next application of the brake pedal 12, the fluid pressure in bore portions 159 and 304 will again be substantially the same. The force via piston 330 urging the detent member 306 to the right will be determined solely by the effect of the area of piston portion 336; however, the force on detent member 306 urging it to the left will be determined not only by the effect of the area of piston portion 322, but also by the effect of the area of the bushing 332. Since the forces on piston portions 322 and 336 will be substantially the same, the extra force via bushing 316 will cause the detent member 306 to be moved to the left until bushing 316 engages shoulder 324 and the forces on member 306 will be equalized and it will have been returned to its deactuated position at which the switch 312 will be deactuated. A similar sequence will occur upon failure and repair of the front brake system via the action of bushing 332. Note that the return is automatic and in the event of a false indication resulting from a transient the apparatus will automatically return to its original position.

In the event of failure of the front brake system it is desirable to bypass the proportioning valve assembly 28 in order that maximum braking pressure can be applied to the rear brakes. This is done by by-pass valve 32. A fluid passage 400 is located intermediate the ends of bore portion 304 and communicates with bore 48 and hence with outlet passage 38. Normally the seals 326 and 328 on piston 314 are located on opposite sides of the opening 402 of passage 400. However, upon front brake system failure and movement of piston 314 to the left the opening 402 is placed in communication with the bore 36 and inlet passage 35 whereby a fluid path (including passage 35, bore 36, bore 304, opening 402, passage 400, bore 48, and passage 38) is defined by passing the proportioning valve assembly 28. Upon correction of the failure and return of piston 314, the bypass opening 402 and passage 400 will again be blocked and the proportioning valve assembly 28 will again be operative.

While it will be apparent that the preferred embodiments of the invention disclosed is well calculated to fulfill the objects above stated, it will be appreciated that the invention is susceptible to modification, variation and change without departing from the proper scope or fair meaning of the invention.

What is claimed is:

1. In a brake system for a vehicle having front and rear brakes and having a front brake system separate from a rear brake system the improvement comprising: failure indicating means for providing a signal in response to failure of either the front or the rear brake system, said indicating means comprising pressure responsive means responsive to the pressure in both the front and rear brake systems and normally being in a first condition in response to the pressures in both systems being approximately normal and being actuable to a second condition in response to the pressure in either system being not normal and remaining in said second condition even after deactuation of the vehicle brake system, signal means for providing said signal in response to said pressure responsive means being actuated to said second condition, and reset means operatively connected with said pressure responsive means for automatically resetting said pressure responsive means from said second condition to said first condition in response to actuation of the vehicle brake system and the pressure in both systems returning to normal.

2. The apparatus of claim 1 with said pressure responsive means comprising an actuating member slidably supported for movement between a deactuated and an actuated position, and first piston means responsive to the fluid pressure in each system for sliding said actuating member, said first piston means normally providing balanced forces on opposite ends of said actuating member in response to normal pressures in both systems whereby said actuating member is not moved and providing unbalanced forces on said opposite ends in response to the pressure in either system not being normal whereby said actuating member is moved to said actuated position, said reset means including second piston means operatively connected with said actuating member and not effectively actuable on said actuating member under pressures not normal in either system and responsive to a return to normal pressures in both systems to exert an unbalancing force on said actuating member to return it to said deactuated position.

3. The apparatus of claim 2 with said first piston means comprising a pair of defined first piston members operatively connected with said actuating member at said opposite ends with each of said first piston members being located in fluid communication with one of the systems and with said second piston means comprising a pair of second piston members separate from and engageable with said actuating member at said opposite ends.

4. The apparatus of claim 3 with said second piston members being a pair of annular bushing members.

5. The apparatus of claim 4 with said actuable member being slidably located in a first bore with said second bushing members normally engaging the opposite end walls of said first bore under normal fluid pressure in each system.

6. The apparatus of claim 5 with said first and second piston members being separate from said actuating member and each slidably supported in one of said second piston members.

7. The apparatus of claim 6 with said actuating member having a detent groove and with said signal means including a movable plunger located in said groove in said first condition and moved out of said groove in said second condition.

8. The apparatus of claim 2 further comprising proportioning valve means in series circuit with the rear brake system with the input to said proportioning valve means being in fluid communication with said first piston means at one of said opposite ends.

9. The apparatus of claim 8 further comprising bypass means actuable for bypassing said proportioning valve means in response to failure of the front brake system, said bypass means being actuable in response to actuation of said first piston means.

10. The apparatus of claim 2 further comprising metering valve means in series circuit with the front brake system with the input to said metering valve means being in fluid communication with said first piston means at one of said opposite ends.

11. The apparatus of claim 3 further comprising proportioning valve means in series circuit with the rear brake system with the input to said proportioning valve means being in fluid communication with one of said first piston members at one of said opposite ends, bypass means actuable for bypassing said proportioning valve means in response to failure of the front brake system, said bypass means being actuable in response to actuation of said one of said first piston members.

12. The apparatus of claim 11 with said bypass means comprising an annular seal supported on said one of said first piston members.

13. The apparatus of claim 12 further comprising metering valve means in series circuit with the front brake system with the input to said metering valve means being in fluid communication with the other of said first piston members at one of said opposite ends.

14. The apparatus of claim 1 with said pressure responsive means comprising an actuating member slidably supported for movement between a deactuated position and a pair of actuated positions located on opposite sides of said deactuated position, said reset means comprising piston means operatively connected with said actuating member and not effectively actuable on said actuating member under pressures not normal in either system and with said actuating member located in one of said actuated positions being responsive to a return to normal pressure in both systems to exert an unbalancing force on said actuating member to return it to said deactuated position.

15. The apparatus of claim 14 with said piston means comprising a piston member engageable with said actuating member in said one actuated position.

16. The apparatus of claim 14 with said failure indicating means comprising a housing having a bore and with said actuating member slidably supported in said bore, said piston means comprising a piston member engageable with said actuating member and movable therewith to said one actuated position, hold-off means for holding said piston member from movement with said actuating member to the other of said actuated positions.

17. The apparatus of claim 16 with said piston member being of a tubular construction and engageable with said actuating member when in said one actuated position and increasing the effective area acting on said actuating member to return said actuating member to said deactuated position.

18. The apparatus of claim 17 with said piston means comprising a second piston member engageable with said actuating member on the side thereof opposite from said piston member and being movable with said actuating member to said other actuated position, second hold-off means for holding said second piston member from movement with said actuating member to said one actuated position, said second piston member being of a tubular construction and engageable with said actuating member when in said other actuated position increasing the effective area acting on said actuating member to return said actuating member to said deactuated position.

References Cited

UNITED STATES PATENTS

| | | |
|---|---|---|
| 3,147,045 | 9/1964 | Stelzer. |
| 3,336,451 | 8/1967 | Burton _____ 200—82 |
| 3,374,322 | 3/1968 | Miller _____ 303—84 XR |
| 3,375,852 | 4/1968 | Milster. |

MILTON BUCHLER, Primary Examiner

J. J. McLAUGHLIN, JR., Primary Examiner

U.S. Cl. X.R.

60—54.5; 116—70; 137—87; 188—151, 152; 200—82; 303—84